(12) United States Patent
Ogawa (10) Patent No.: US 10,101,700 B2
(45) Date of Patent: Oct. 16, 2018

(54) IMAGE FORMING APPARATUS FOR DETERMINING MARGIN AREA SIZE OF SHEET

(71) Applicant: KYOCERA Document Solutions Inc., Osaka (JP)

(72) Inventor: Shinya Ogawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/790,596

(22) Filed: Oct. 23, 2017

(65) Prior Publication Data

US 2018/0129155 A1 May 10, 2018

(30) Foreign Application Priority Data

Nov. 4, 2016 (JP) ................. 2016-216031

(51) Int. Cl.
*G06F 3/12* (2006.01)
*G03G 15/00* (2006.01)
*H04N 1/00* (2006.01)

(52) U.S. Cl.
CPC ..... *G03G 15/5095* (2013.01); *G03G 15/5087* (2013.01); *G03G 15/607* (2013.01); *G06F 3/12* (2013.01); *H04N 1/00* (2013.01)

(58) Field of Classification Search
None
See application file for complete search history.

(56) References Cited

U.S. PATENT DOCUMENTS 8,553,273 B2 10/2013 Kimoto
2011/0051195 A1* 3/2011 Kimoto ............... H04N 1/3876
358/1.18

FOREIGN PATENT DOCUMENTS

JP 2011-051100 A 3/2011

* cited by examiner

*Primary Examiner* — Andrew H Lam
(74) *Attorney, Agent, or Firm* — Studebaker & Brackett PC (57) ABSTRACT

An image forming apparatus includes a generation section, an image forming section, and a size determining section. The generation section divides a first image to generate a plurality of second images. The image forming section forms the second images on a plurality of sheets, respectively. The size determining section determines a size of a margin area allocated to at least one of the sheets. The image forming section forms the second images on the sheets, respectively, so that the second images are placed in a designated area on a combined sheet that is to be formed by combining the sheets. The size determining section determines the size of the margin area based on sizes of the designated area and the first image.

8 Claims, 10 Drawing Sheets

IMAGE FORMING APPARATUS FOR DETERMINING MARGIN AREA SIZE OF SHEET

INCORPORATION BY REFERENCE

The present application claims priority under 35 U.S.C. § 119 to Japanese Patent Application No. 2016-216031, filed on Nov. 4, 2016. The contents of this application are incorporated herein by reference in their entirety.

BACKGROUND

The present disclosure relates to image forming apparatuses.

In existing image forming apparatuses, a rectangular image is divided lengthwise and widthwise, and a plurality of divided images is generated. The divided images are formed on a plurality of sheets, respectively. The original rectangular image is composed by combining the sheets. A margin portion is provided on one of two adjoining sheets and a margin-less printed portion is provided on the other adjoining sheet so that when the sheets are combined, blank space need not be cut off by scissors, for example. An image is formed up to the edge of the sheet in the margin-less printed portion. A divided image is not formed in the margin portion.

SUMMARY

An image forming apparatus according to an aspect of the present disclosure includes a generation section, an image forming section, and a size determining section. The generation section divides a first image to generate a plurality of second images. The image forming section forms the second images on a plurality of sheets, respectively. The size determining section determines a size of a margin area to be allocated to at least one of the sheets. The image forming section forms the second images on the sheets, respectively, so that the second images are placed in a designated area on a combined sheet that is to be formed by combining the sheets. The size determining section determines the size of the margin area based on sizes of the designated area and the first image.

DETAILED DESCRIPTION

Hereinafter, an embodiment of the present disclosure will be described with reference to FIGS. 1 to 12. Note that within the drawings, the same or equivalent sections are denoted with the same reference numbers and descriptions thereof are not repeated.

First Embodiment

Figure 1:
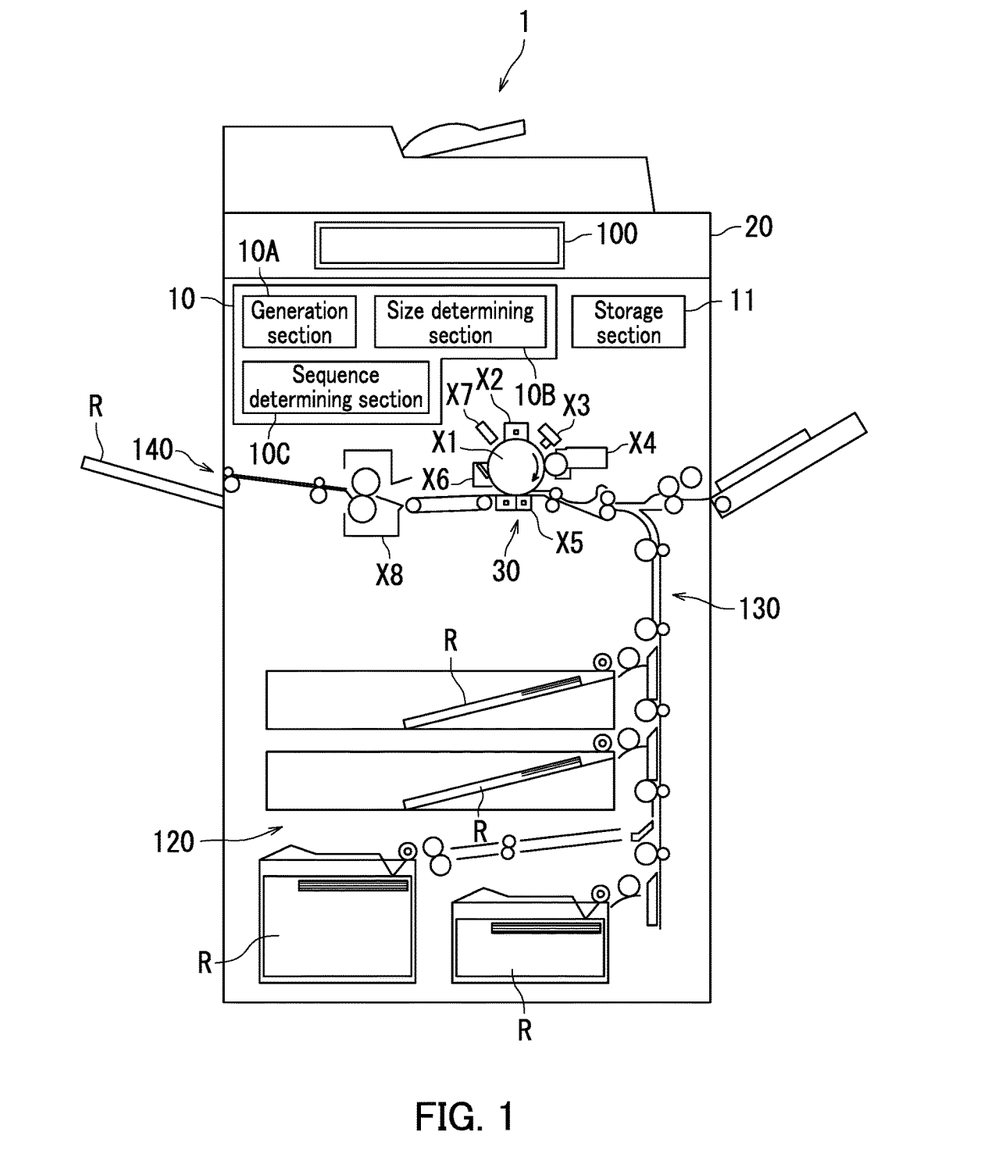
FIG. 1 is a diagram illustrating an image forming apparatus according to a first embodiment of the present disclosure.

An image forming apparatus 1 according to a first embodiment of the present disclosure will be described with reference to FIG. 1. FIG. 1 illustrates the image forming apparatus 1 according to the first embodiment. The image forming apparatus 1 is a multifunction peripheral, for example. The image forming apparatus 1 is used to make a poster, for example. A plurality of sheets is combined to make the poster.

As illustrated in FIG. 1, the image forming apparatus 1 includes a controller 10, a storage section 11, a document reading section 20, an image forming section 30, an input section 100, a housing section 120, a conveyance section 130, and an ejection section 140. The controller 10 controls the storage section 11, the document reading section 20, the image forming section 30, the input section 100, the housing section 120, the conveyance section 130, and the ejection section 140. The controller 10 includes a processor, for example. Computer programs and data are stored in the storage section 11. The storage section 11 may include either or both semiconductor memory and a hard disk drive, for example. The input section 100 receives operations of a user and inputs various information to the controller 10. The input section 100 includes a touch panel, for example.

The document reading section 20 reads an image from an original document. The housing section 120 houses a plurality of sheets R. The sheets R have rectangular forms. The conveyance section 130 conveys the sheets R from the housing section 120 to the ejection section 140 through the image forming section 30. The conveyance section 130 includes conveyance rollers. The image forming section 30 forms an image on a sheet R. Specifically, the image forming section 30 includes a photosensitive drum x1, a charger x2, an exposure device x3, a developing device x4, a transfer device x5, a cleaning device x6, a static elimination device x7, and a fixing device x8.

The charger x2 charges the photosensitive drum x1 to a specific potential. The exposure device x3 forms an electrostatic latent image corresponding to image data on the photosensitive drum x1 by outputting laser light based on image data and exposing the photosensitive drum x1. The developing device x4 supplies toner to the electrostatic latent image on the photosensitive drum x1 and develops and forms a toner image on the photosensitive drum x1. The transfer device x5 transfers the toner image on the photosensitive drum x1 to a sheet R. The cleaning device x6 removes the toner remaining on the photosensitive drum x1 after the transfer. The static elimination device x7 removes residual charge from the photosensitive drum x1. The fixing device x8 fixes the toner image to the sheet R by applying heat and pressure. As a result, the image is formed on the sheet R. The ejection section 140 ejects the sheet R with the image formed thereon. The ejection section 140 includes ejection rollers.

Continuing, the controller 10 will be described in detail as relating to the image forming section 30 and the ejection section 140 with reference to FIG. 1.

The controller 10 includes a generation section 10A, a size determining section 10B, and a sequence determining section 10C. Specifically, the controller 10 (specifically, a processor) executes computer programs stored in the storage section 11 to function as the generation section 10A, the size determining section 10B, and the sequence determining section 10C.

The generation section 10A generates a first image by enlarging an original image. The original image and the first image both have rectangular forms. The aspect ratios of the first image and the original image are equal. That is, the first image is similar to the original image.

The generation section 10A then divides the first image to generate a plurality of second images. The image forming section 30 forms the second images on a plurality of sheets R, respectively. Specifically, the image forming section 30 forms the second images on the sheets R, respectively, so that the second images are placed in a designated area on a combined sheet. The combined sheet is to be formed by combining the sheets R. The combined sheet is a poster, for example.

Specifically, each of the sheets R has a margin area except for one sheet. Each margin area is an area for combining (pasting, for example) the sheets R together. The sheets R are combined (pasted, for example) in the respective margin areas. As a result, the combined sheet is formed. The second images restore the first image in the combined sheet by forming the combined sheet. Hereinafter, one sheet R having no margin area from the plurality of sheets R may be referred to as a reference sheet RR.

The designated area refers to an area where an image (the second images, for example) can be formed on a main surface of the combined sheet. In other words, the designated area refers to an area on the main surface of the combined sheet excluding a blank area. The blank area is formed along the outer edge of the combined sheet and refers to an area where an image (the second images, for example) must not be formed. However, the combined sheet may not have a blank area. When the combined sheet has no blank area, the designated area refers to the entire area of the main surface of the combined sheet.

In the following description, the designated area refers to the entire area of the main surface of the combined sheet.

The size determining section 10B determines sizes of the margin areas to be allocated to at least one of the sheets R before the second images are formed on the sheets R. Specifically, the size determining section 10B determines the sizes of the margin areas based on the sizes of the designated area of the combined sheet and the first image.

According to the first embodiment, occurrence of excess area in the designated area can be accordingly prevented by determining the sizes of the margin areas such that sizes of the designated area and the first image match. That is, the size of the designated area can be optimized. The excess area refers to an empty area where images (the second images, for example) are not formed. In the first embodiment, it is unnecessary to cut the combined sheet when the sheets R with the second images formed thereon are combined to constitute one first image because the occurrence of excess area can be prevented. Thus, convenience to the user is improved. It is also unnecessary to cut the combined sheet when the first image is of a non-standard size but the sheets R are of a standard size because the occurrence of excess area can be prevented. Thus, convenience to the user is further improved.

The sequence determining section 10C determines the sequence to which the second images are formed on the sheets R based on the sequence to which the sheets R are combined to form the combined sheet. For example, the sequence determining section 10C determines the sequence to which the second images are formed on the sheets R to be the sequence to which the sheets R are combined to form the combined sheet.

The image forming section 30 then forms the second images on the sheets R according to the sequence determined by the sequence determining section 10C. The ejection section 140 ejects the sheets R with the second images formed thereon according to the sequence determined by the sequence determining section 10C. According to the first embodiment, it is accordingly unnecessary to rearrange the sheets R when the ejected sheets R are combined to form the combined sheet. Convenience to the user is thus further improved.

For example, the sequence determining section 10C can also determine the sequence to which the second images are formed on the sheets R to be the reverse sequence to which the sheets R are combined.

[Margin Areas]

Figure 2:
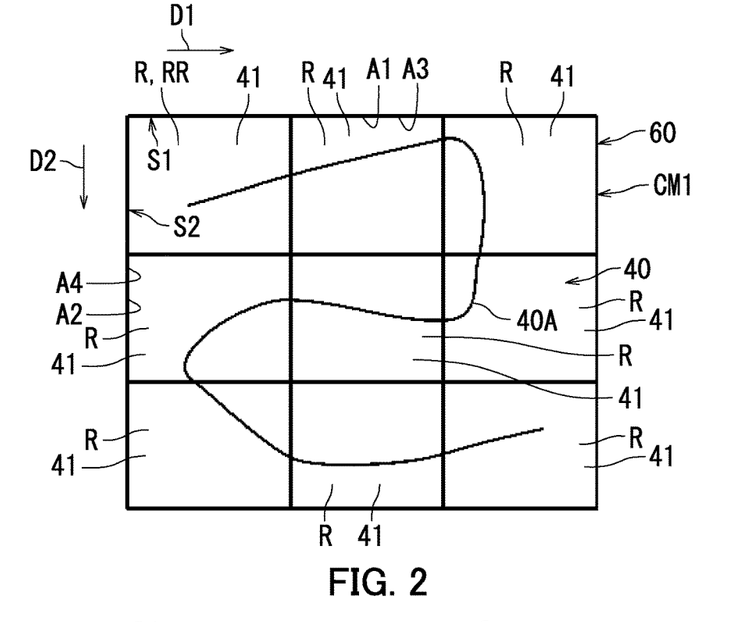
FIG. 2 is a diagram illustrating a combined sheet according to the first embodiment.
Figure 3:
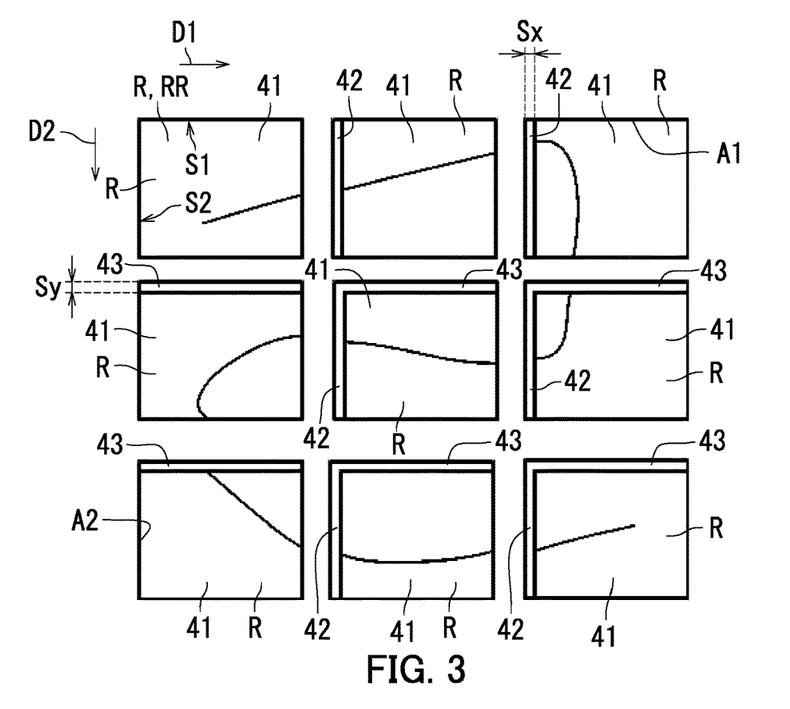
FIG. 3 is a diagram illustrating a plurality of sheets according to the first embodiment.

Next, the margin areas will be specifically described with reference to FIGS. 2 and 3. FIG. 2 illustrates a combined sheet CM1. FIG. 3 illustrates the plurality of sheets R before combining.

As illustrated in FIG. 2, the combined sheet CM1 has a designated area 60. A first image 40 including a pattern 40A is formed on the combined sheet CM1. Specifically, the first image 40 is formed in the designated area 60.

Since second images 41 are formed on the sheets R, respectively, the first image 40 is composed of the second images 41 on the combined sheet CM1. The first image 40 has a rectangular form, and has a pair of first sides A1 facing each other and a pair of second sides A2 facing each other. The second sides A2 are perpendicular to the first sides A1. The designated area 60 also has a rectangular form, and has a pair of third sides A3 facing each other and a pair of fourth sides A4 facing each other. The fourth sides A4 are perpendicular to the third sides A3. The third sides A3 correspond to the first sides A1, and the fourth sides A4 correspond to the second sides A2.

The combined sheet CM1 is formed by combining the sheets R (nine sheets R in FIG. 2). The size determining section 10B sets one sheet R from the plurality of sheets R as the reference sheet RR to form a corner section of the combined sheet CM1 before forming the second images 41. The reference sheet RR has a pair of long sides S1 facing each other and a pair of short sides S2 facing each other. The short sides S2 are perpendicular to the long sides S1. The sheets R are arranged in a first direction D1 and a second direction D2. The first direction D1 is a direction approximately parallel to the long sides S1 (specific sides) of the reference sheet RR. The second direction D2 is a direction approximately parallel to the short sides S2 of the reference sheet RR. That is, the second direction D2 is a direction orthogonal to the first direction D1.

As illustrated in FIG. 3, the reference sheet RR has no margin area (a first margin area 42 or a second margin area 43). That is, the size determining section 10B does not allocate a margin area (the first margin area 42 or the second margin area 43) to the reference sheet RR.

The size determining section 10B allocates the first margin area 42 to each of the sheets R to be arranged in the first direction D1 from the plurality of sheets R with the reference sheet RR as a starting point. Each first margin area 42 is an area (a rectangular area, for example) that extends in the second direction D2, and is allocated corresponding to one short side from the four sides of the sheet R. The first margin area 42 is allocated on an image forming surface of the sheet R. The image forming surface refers to a main surface with the second image from two main surfaces of the sheet R. The main surface opposite to the image forming surface from the two main surfaces of the sheet R is a rear surface. The rear surface of the sheet R refers to the main surface without the second image from the two main surfaces of the sheet R. The first margin area 42 is allocated to the sheet R along the joint of the second images 41 that are adjacent to each other in the first direction D1.

The size determining section 10B allocates the second margin area 43 to each of the sheets R to be arranged in the second direction D2 from the plurality of sheets R with the reference sheet RR as a starting point. Each second margin area 43 is an area (a rectangular area, for example) that extends in the first direction D1, and is allocated corresponding to one long side from the four sides of the sheet R. The second margin area 43 is allocated to the image forming surface of the sheet R. The second margin area 43 is allocated to the sheet R along the joint of the second images 41 that are adjacent to each other in the second direction D2.

The size determining section 10B allocates a first margin area 42 and a second margin area 43 to each sheet R to be arranged in a direction intersecting with the first direction D1 and the second direction D2 from the plurality of sheets R, relative to the reference sheet RR. Together, the first margin area 42 and the second margin area 43 form an approximately L-shaped area.

A first default value Sxd (a default value) related to the size of the first margin area 42 is preset for the first margin area 42 (a margin area). Specifically, the first default value Sxd is preset for a width Sx of the first margin area 42. The width Sx refers to a width in the first direction D1.

A second default value Syd (a default value) related to the size of the second margin area 43 is also preset for the second margin area 43 (a margin area). Specifically, the second default value Syd is preset for a width Sy of the second margin area 43. The width Sy refers to a width in the second direction D2. The first and second default values Sxd and Syd are set such that the sheets R can be combined together with enough necessary strength. The first and second default values Sxd and Syd are set as the same value, for example.

[Margin Area Size Determination Processing]

Figure 4:
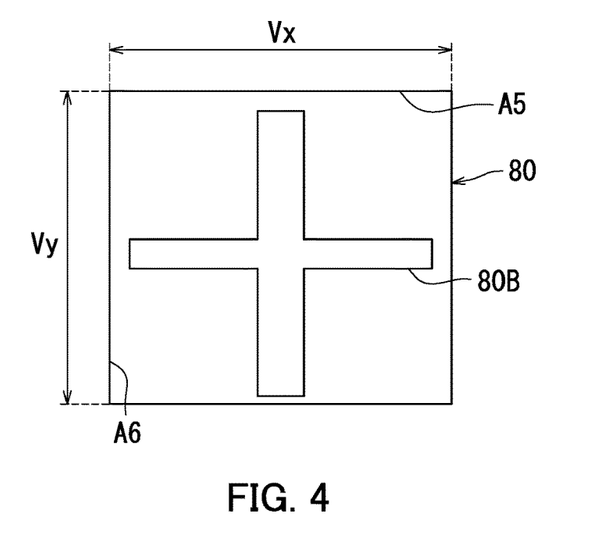
FIG. 4 is a diagram illustrating an original image according to the first embodiment.
Figure 5:
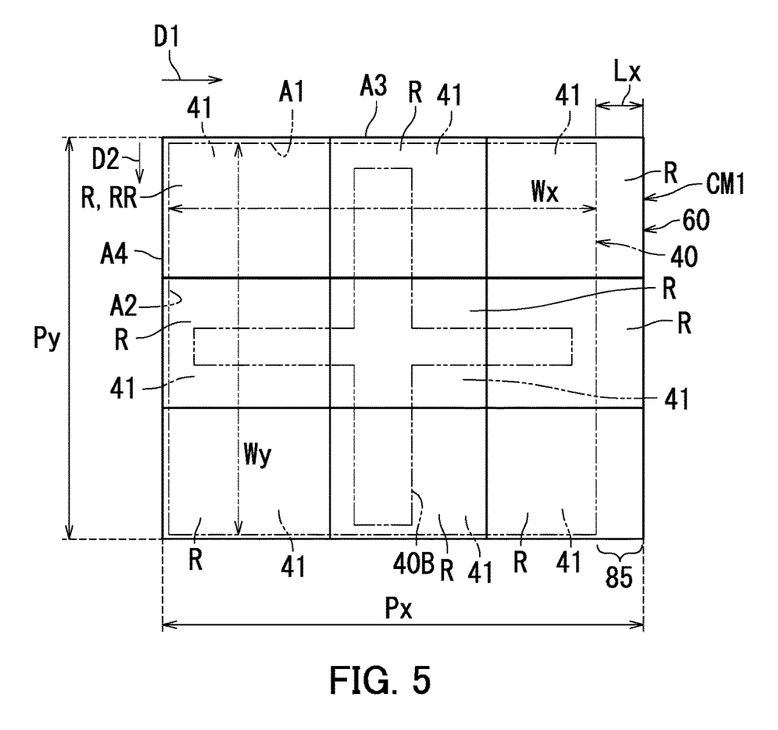
FIG. 5 is a diagram illustrating the combined sheet according to the first embodiment.
Figure 6:
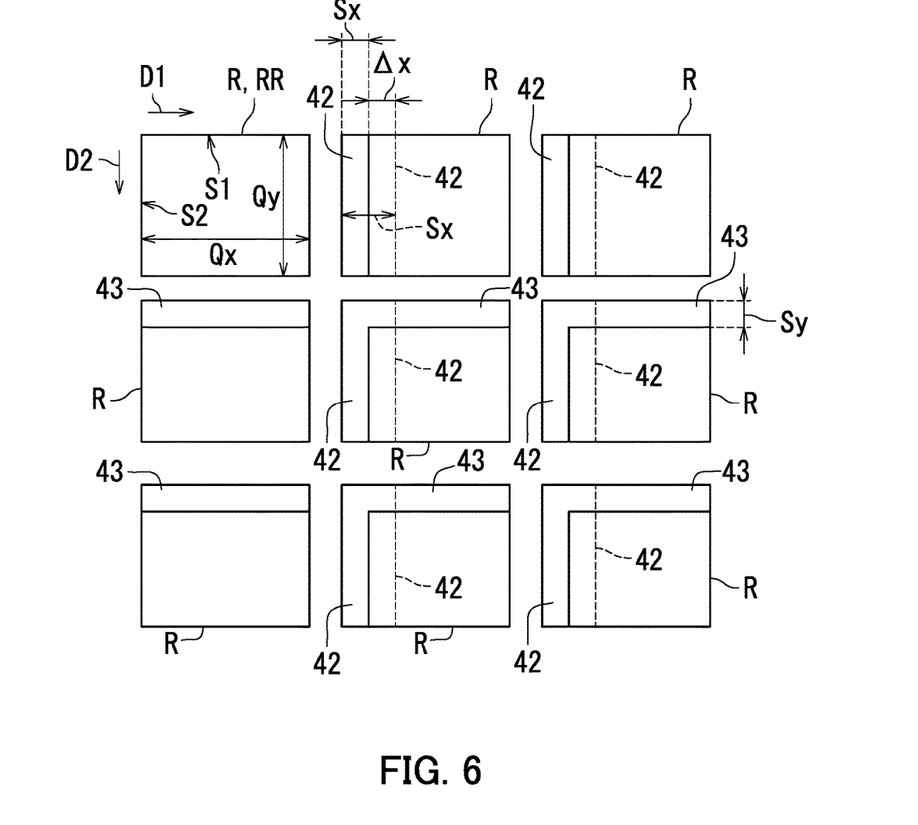
FIG. 6 is a diagram illustrating the plurality of sheets according to the first embodiment.
Figure 7:
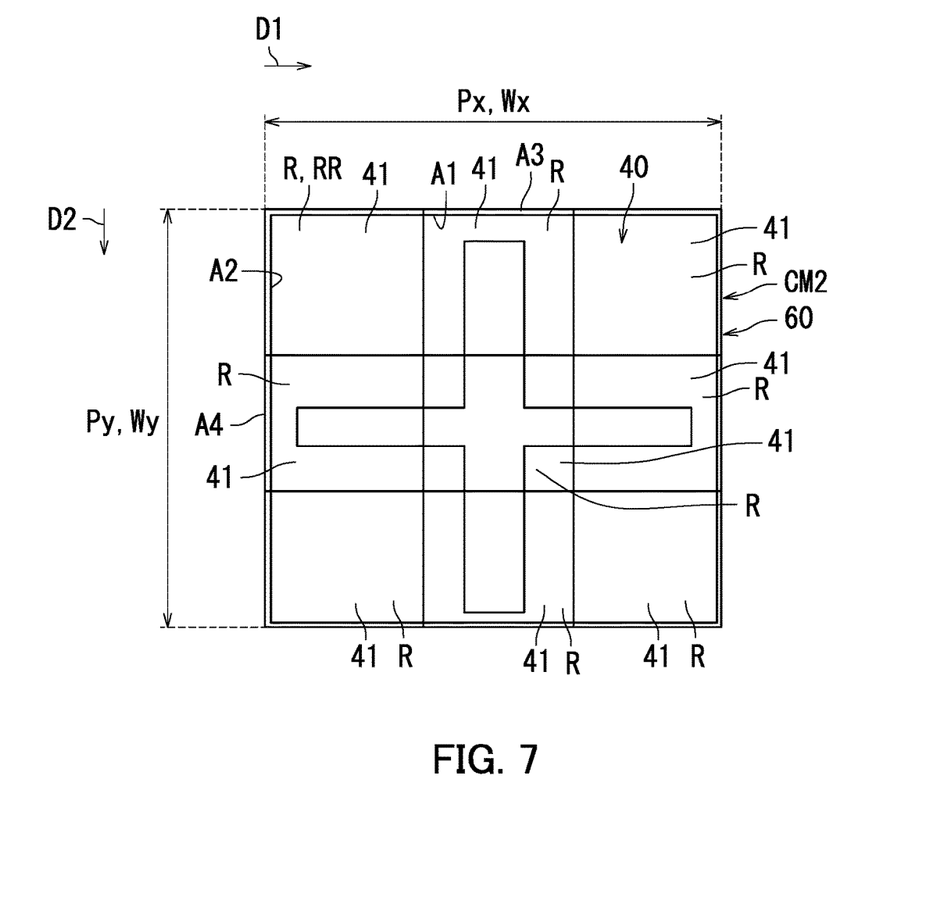
FIG. 7 is a diagram illustrating the combined sheet according to the first embodiment.

Next, size determination processing of the margin areas will be specifically described with reference to FIG. 1 and FIGS. 4 to 7. FIG. 4 illustrates an original image 80. FIG. 5 illustrates the combined sheet CM1. The first image 40 and the second images 41 are indicated by dashed and double dotted lines in FIG. 5. FIG. 6 illustrates the plurality of sheets R. FIG. 7 illustrates a combined sheet CM2 after the designated area 60 has been optimized. The combined sheet CM2 is a poster, for example.

As illustrated in FIG. 4, the original image 80 includes a pattern 80B. The original image 80 has a rectangular form, a pair of fifth sides A5 facing each other, and a pair of sixth sides A6 facing each other. The sixth sides A6 are perpendicular to the fifth sides A5. The fifth sides A5 correspond to the first sides A1 of the first image 40, and the sixth sides A6 correspond to the second sides A2 of the first image 40. The fifth sides A5 have a length Vx, and the sixth sides A6 have a length Vy.

As illustrated in FIG. 5, the third sides A3 of the designated area 60 of the combined sheet CM1 have a length Px, and the fourth sides A4 have a length Py. The designated area 60 has an excess area 85. The first sides A1 of the first image 40 have a length Wx, and the second sides A2 have a length Wy.

As illustrated in FIG. 6, the sizes of the sheets R are equal. The long sides S1 of the sheets R have a length Qx, and the short sides S2 of the sheets R have a length Qy. In FIG. 6, the first margin areas 42 with the first default value Sxd are indicated by solid lines. The first margin areas 42 after correction are indicated by dotted lines.

Description will be continued with reference to FIG. 1 and FIGS. 4 to 6. As illustrated in FIG. 1, the input section 100 receives input of specific information from the user. The specific information is stored in the storage section 11. The specific information includes the size of the original image 80, a printing direction, the size of the sheets R, a division number of the first image 40, and the width of the margin areas. The division number is the number by which the first image 40 is divided. The size of the original image 80 refers to the lengths Vx and Vy. The printing direction refers to the orientation of the second images 41 and the sheets R when the second images 41 are formed on the sheets R. The size of the sheets R refers to the lengths Qx and Qy. The division number of the first image 40 refers to a division number Nx of the first direction D1 of the first image 40 and a division number Ny of the second direction D2 of the first image 40. In the example illustrated in FIG. 5, the division numbers Nx and Ny are each "3". The width of the margin areas refers to the width Sx of the first margin areas 42 and the width Sy of the second margin areas 43. That is, the first default value Sxd is entered as the width Sx of the first margin areas 42 and the second default value Syd is entered as the width Sy of the second margin areas 43.

The generation section 10A calculates the length Px of the third sides A3 of the designated area 60 using a formula (1) and the length Py of the fourth sides A4 of the designated area 60 using a formula (2). The generation section 10A substitutes "Sx" of the formula (1) with the first default value Sxd and "Sy" of the formula (2) with the second default value Syd.

$$Px = Nx \times Qx - (Nx-1) \times Sx \tag{1}$$

$$Py = Ny \times Qy - (Ny-1) \times Sy \tag{2}$$

The generation section 10A calculates a magnification α1 (hereinafter referred to as "first magnification α1") of the fifth sides A5 of the original image 80 using a formula (3). The generation section 10A also calculates a magnification α2 (hereinafter referred to as "second magnification α2") of the sixth sides A6 of the original image 80 using a formula (4).

$$\alpha 1 = Px/Vx \tag{3}$$

$$\alpha 2 = Py/Vy \tag{4}$$

As indicated by the formula (3), the first magnification α1 is the value obtained by dividing the length Px of the third sides A3 by the length Vx of the fifth sides A5, and is the ratio of the length Px to the length Vx. As indicated by the formula (4), the second magnification α2 is the value obtained by dividing the length Py of the fourth sides A4 by the length Vy of the sixth sides A6, and is the ratio of the length Py to the length Vy.

The generation section 10A enlarges the original image 80 by the smaller of the two magnifications: the first magnification α1 or the second magnification α2. Specifically, the generation section 10A enlarges each of the fifth sides A5 and the sixth sides A6 of the original image 80 by the smaller of the two magnifications: the first magnification α1 or the second magnification α2.

In the examples illustrated in FIGS. 4 and 5, the second magnification α2 is smaller than the first magnification α1. The length Wy of the second sides A2 of the first image 40 is accordingly equal to the length Py of the fourth sides A4 of the designated area 60, because the first image 40 is generated by enlarging the original image 80 by the second magnification α2.

Hereinafter, the smaller of the two magnifications, the first magnification α1 or the second magnification α2, will be referred to as a magnification α. The generation section 10A accordingly calculates the length Wx of the first sides A1 of the first image 40 using a formula (5). The generation section 10A also calculates the length Wy of the second sides A2 of the first image 40 using a formula (6).

$$Wx = Vx \times \alpha \quad (5)$$

$$Wy = Vy \times \alpha \quad (6)$$

The size determining section 10B calculates a first difference Lx using a formula (7) and a second difference Ly using a formula (8). The first difference Lx refers to a difference between the length Px of the third sides A3 of the designated area 60 and the length Wx of the first sides A1 of the first image 40. The second difference Ly refers to a difference between the length Py of the fourth sides A4 of the designated area 60 and the length Wy of the second sides A2 of the first image 40.

$$Lx = Px - Wx \quad (7)$$

$$Ly = Py - Wy \quad (8)$$

The size determining section 10B calculates a first correction value Δx (correction value) for correcting the width Sx (size) of the first margin areas 42 (margin areas) from the first default value Sxd (default value) based on the first difference Lx (difference) when the first difference Lx is greater than zero. In the examples illustrated in FIGS. 4 and 5, the first difference Lx is greater than zero. On the other hand, the second difference Ly is zero. The size determining section 10B also calculates a second correction value Δy (correction value) for correcting the width Sy (size) of the second margin areas 43 (margin areas) from the second default value Syd (default value) based on the second difference Ly (difference) when the second difference Ly is greater than zero.

Specifically, the size determining section 10B calculates the first correction value Δx (correction value), based on the first difference Lx (difference) and the division number Nx of the first image 40, using a formula (9). The size determining section 10B also calculates the second correction value Δy (correction value), based on the second difference Ly (difference) and the division number Ny of the first image 40, using a formula (10).

$$\Delta x = Lx/(Nx-1) \quad (9)$$

$$\Delta y = Ly/(Ny-1) \quad (10)$$

The size determining section 10B then corrects the width Sx of the first margin areas 42 by adding the first correction value Δx to the first default value Sxd using a formula (11). The first margin areas 42 after correction are indicated by dotted lines in FIG. 6. The size determining section 10B corrects the width Sy of the second margin areas 43 by adding the second correction value Δy to the second default value Syd using a formula (12).

$$Sx = Sxd + \Delta x \quad (11)$$

$$Sy = Syd + \Delta y \quad (12)$$

The size determining section 10B further allocates either or both a first margin area 42 and a second margin area 43 to the sheets R from the plurality of sheets R other than the reference sheet RR.

The image forming section 30 then forms the second images 41 in an area of the image forming surface of the sheets R where there is no first margin area 42 or second margin area 43. The image forming section 30 forms the second images 41 on the sheets R, respectively. The ejection section 140 then sequentially ejects the sheets R. The ejected sheets R are combined to form the combined sheet CM2.

As illustrated in FIG. 7, the length Px of the third sides A3 of the designated area 60 is equal to the length Wx of the first sides A1 of the first image 40. This is because the width Sx of the first margin areas 42 in the examples illustrated in FIGS. 4 to 6 is corrected. That is, the size of the designated area 60 is optimized and the excess area 85 (FIG. 5) is removed. The length Py of the fourth sides A4 of the designated area 60 is also equal to the length Wy of the second sides A2 of the first image 40.

As previously described with reference to FIG. 1 and FIGS. 4 to 7, the size determining section 10B calculates the first correction value Δx for correcting the width Sx of the first margin areas 42 based on the first difference Lx when the first difference Lx is greater than zero, according to the first embodiment. The size determining section 10B also calculates the second correction value Δy for correcting the width Sy of the second margin areas 43 based on the second difference Ly when the second difference Ly is greater than zero.

The width Sx of the first margin areas 42 or the width Sy of the second margin areas 43 is accordingly corrected without excess or deficiency, and the occurrence of the excess area 85 in the designated area 60 can be further inhibited. As a result, the work needed to cut the combined sheet CM2 can be omitted, and convenience for the user is further improved.

The size determining section 10B according to the first embodiment also calculates (formula (9)) the first correction value Δx based on the first difference Lx and the division number Nx of the first image 40. The size determining section 10B calculates (formula (10)) the second correction value Δy based on the second difference Ly and the division number Ny of the first image 40.

The first correction value Δx can accordingly be uniformly assigned to the first margin areas 42. The second correction value Δy can also be uniformly assigned to the second margin areas 43. Accordingly, the widths Sx of the first margin areas 42 become equal, and the widths Sy of the second margin areas 43 become equal. As a result, the size of the second image 41 formed on each sheet R can be easily calculated.

Furthermore, the original image 80 is enlarged by the smaller of the two magnifications α: the first magnification α1 or the second magnification α2, according the first embodiment. Accordingly, the length Wy of the second sides A2 of the first image 40 must equal the length Py of the fourth sides A4 of the designated area 60, or the length Wx of the first sides A1 of the first image 40 must equal the length Px of the third sides A3 of the designated area 60. As a result, only one of the first margin areas 42 or the second margin areas 43 need be corrected, and processing can be accelerated.

When the original image 80 has a non-standard aspect ratio and is enlarged to make a poster, for example, the poster can be made as large as possible without exceeding the range of a standard size after completion. As a result, a poster of a size near the limit of the standard size can be made without altering the aspect ratio of the original image 80.

[Ejection Sequence]

Next, the ejection sequence of the plurality of sheets R will be described with reference to FIGS. 1 to 8. As illustrated in FIG. 1, the ejection section 140 ejects the sheets R so that the image forming surface of each of the sheets R faces upward, in a sequence to which the sheets R will be combined. In this case, the ejection section 140 ejects the reference sheet RR (FIG. 6) last from the plurality of sheets R (FIG. 6) to form the combined sheet CM2 (FIG. 7). The ejection section 140 also ejects the sheet R to be placed at the corner section in a direction intersecting with the first direction D1 and the second direction D2 first from the plurality of sheets R, relative to the reference sheet RR.

The ejection sequence of when sheets R1 to R9 are ejected with the image forming surfaces thereof facing upward will be described using specific examples, with reference to FIG. 8. FIGS. 8A and 8B are diagrams illustrating the ejection sequence of the sheets R1 to R9. The sheet R1 is the reference sheet RR. In FIGS. 8A and 8B, the sheets R1 to R9 are illustrated in an arrangement forming the combined sheet CM2. Note that the sheets R1 to R9 correspond to the sheets R in FIG. 6. The sheets R2 to R9 each have either or both a first margin area 42 and a second margin area 43 in the same manner as the sheets R in FIG. 6, although an illustration thereof is omitted to simplify the drawings.

Figure 8A:
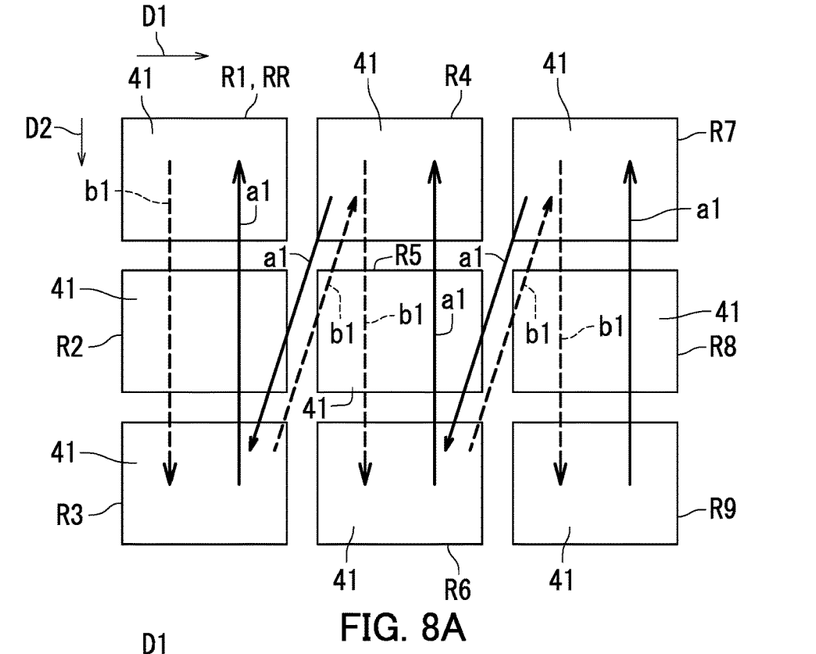
FIGS. 8A and 8B are diagrams illustrating an ejection sequence of the plurality of sheets according to the first embodiment.

As illustrated in FIG. 8A, the ejection section 140 ejects the sheets R1 to R9 in a sequence indicated by solid-lined arrows a1 when the sheets R1 to R9 are ejected with the image forming surfaces thereof facing upward. That is, the ejection section 140 executes ejection in the following sequence: sheet R9, sheet R8, sheet R7, sheet R6, sheet R5, sheet R4, sheet R3, sheet R2, sheet R1. The sequence to which the ejected sheets R1 to R9 are combined is the same as the ejection sequence thereof.

Figure 8B:
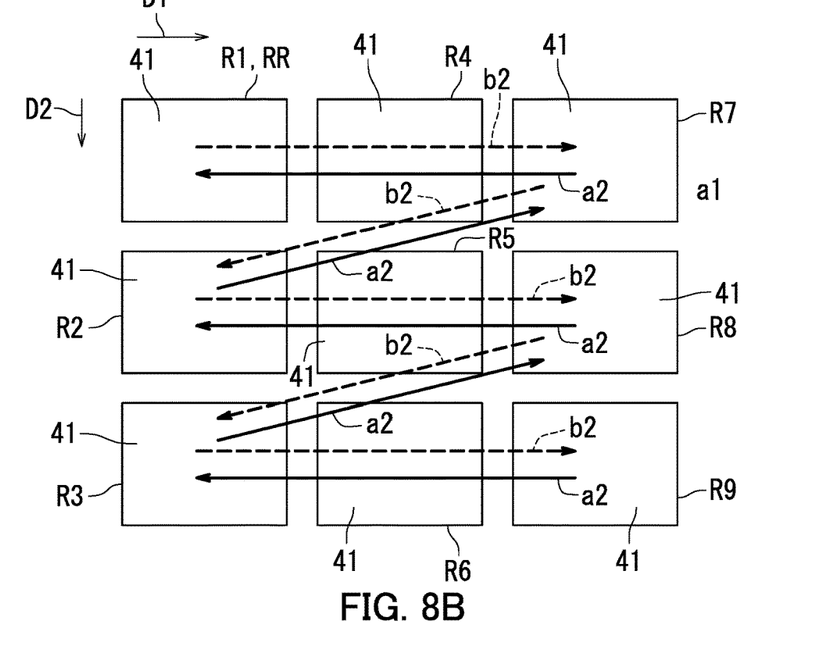

As illustrated in FIG. 8B, the ejection section 140 can also eject the sheets R1 to R9 in a sequence indicated by solid-lined arrows a2 when the sheets R1 to R9 are ejected with the image forming surfaces thereof facing upward. That is, the ejection section 140 can also execute ejection in the following sequence: sheet R9, sheet R6, sheet R3, sheet R8, sheet R5, sheet R2, sheet R7, sheet R4, sheet R1. The sequence to which the ejected sheets R1 to R9 are combined is the same as the ejection sequence thereof.

Note that the sheet R to be placed at the corner section in the direction intersecting with the first direction D1 and the second direction D2 is the sheet R9 from the plurality of sheets R, relative to the reference sheet RR.

As described previously with reference to FIGS. 1 and 8, the reference sheet RR is ejected last when the sheets R1 to R9 are ejected with the image forming surfaces facing upward, according to the first embodiment. The reference sheet RR is accordingly placed above the ejected and stacked sheets R1 to R9. The first margin areas 42 and the second margin areas 43 are also oriented facing upward. Additionally, the sheets R1 to R9 are ejected in the sequence to which the sheets R1 to R9 are combined. The user can accordingly complete a combined sheet CM2 (FIG. 7) by combining the sheets R1 to R9 from the lowermost sheet R9 to the uppermost reference sheet RR (sheet R1) in the same sequence as the ejection sequence thereof. As a result, operation efficiency when combining the sheets R1 to R9 can be improved.

As illustrated in FIG. 1, the ejection section 140 can also eject the sheets R with the image forming surfaces of the sheets R facing downward in the sequence to which the sheets R are combined. In this case, the ejection section 140 ejects the reference sheet RR (FIG. 6) first from the plurality of sheets R (FIG. 6) to form the combined sheet CM2 (FIG. 7). The ejection section 140 also ejects the sheet R to be placed at the corner section in the direction intersecting with the first direction D1 and the second direction D2 last from the plurality of sheets R, relative to the reference sheet RR.

The ejection sequence of when the sheets R1 to R9 are ejected with the image forming surfaces facing downward will be described using specific examples, with reference to FIG. 8.

As illustrated in FIG. 8A, the ejection section 140 ejects the sheets R1 to R9 in a sequence indicated by dotted-lined arrows b1 when the sheets R1 to R9 are ejected with the image forming surfaces facing downward. That is, the ejection section 140 executes ejection in the following sequence: sheet R1, sheet R2, sheet R3, sheet R4, sheet R5, sheet R6, sheet R7, sheet R8, sheet R9. The sequence to which the ejected sheets R1 to R9 are combined is the same as the ejection sequence thereof.

As illustrated in FIG. 8B, the ejection section 140 can also eject the sheets R1 to R9 in a sequence indicated by dotted-lined arrows b2 when the sheets R1 to R9 are ejected with the image forming surfaces facing downward. That is, the ejection section 140 can also execute ejection in the following sequence: sheet R1, sheet R4, sheet R7, sheet R2, sheet R5, sheet R8, sheet R3, sheet R6, sheet R9. The sequence to which the ejected sheets R1 to R9 are combined is the same as the ejection sequence thereof.

As described previously with reference to FIGS. 1 to 8, the reference sheet RR is ejected first when the sheets R1 to R9 are ejected with the image forming surfaces facing downward, according to the first embodiment. The reference sheet RR is accordingly placed below the ejected and stacked sheets R1 to R9. The first margin areas 42 and the second margin areas 43 are also oriented facing downward. Additionally, the sheets R1 to R9 are ejected in the sequence to which the sheets R1 to R9 are combined. The user can accordingly complete a combined sheet CM2 (FIG. 7) by combining the sheets R1 to R9 from the lowermost reference sheet RR (sheet R1) to the uppermost sheet R9 in the same sequence as the ejection sequence thereof. As a result, operation efficiency when combining the sheets R1 to R9 can be improved.

[Summary Image]

Figure 9:
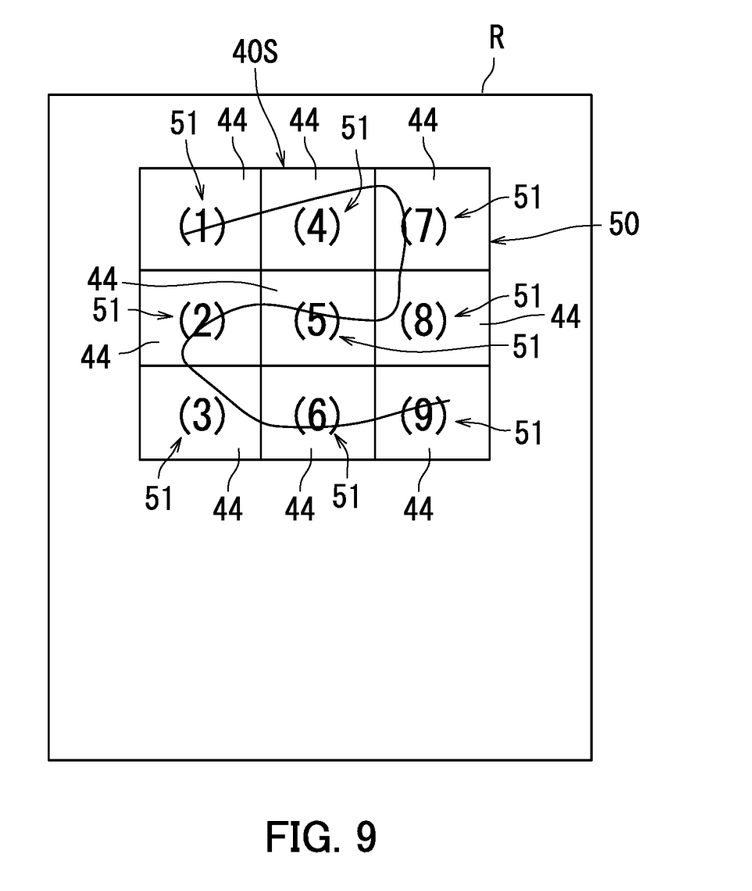
FIG. 9 is a diagram illustrating a summary image according to the first embodiment.
Figure 10:
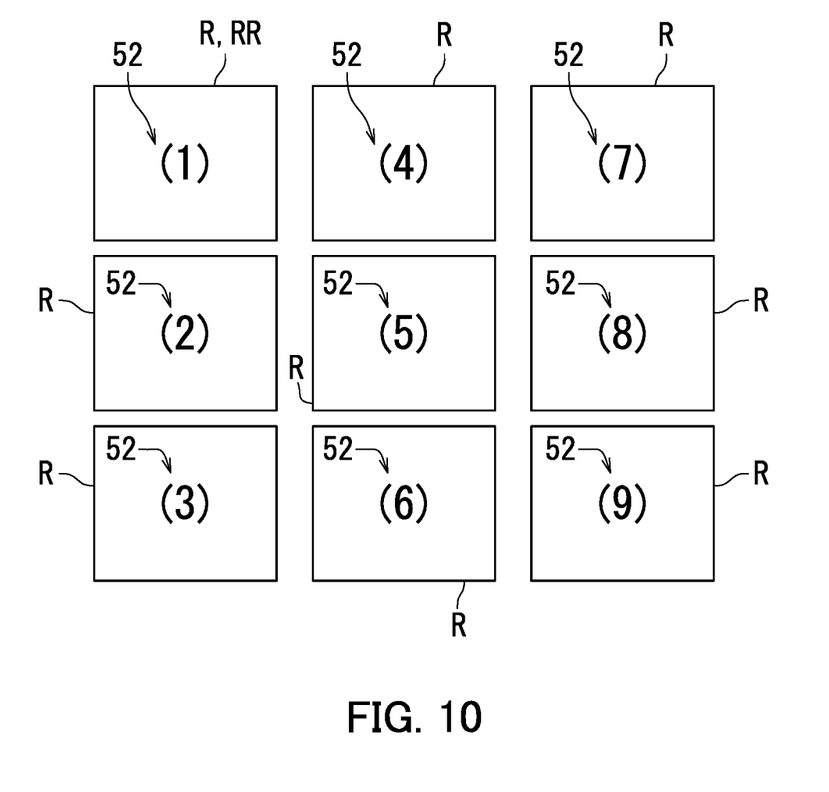
FIG. 10 is a diagram illustrating rear surfaces of the plurality of sheets according to the first embodiment.

Next, a summary image 50 (third image) will be described with reference to FIGS. 9 and 10. FIG. 9 illustrates a sheet R. The sheet R illustrated in FIG. 9 is a sheet R differing from the plurality of sheets R on which the second images 41 are formed. FIG. 10 illustrates the rear surfaces of the sheets R. Second images 41 are formed on the image forming surfaces of the sheets R illustrated in FIG. 10.

As illustrated in FIG. 9, the image forming section 30 forms the summary image 50 on one of the sheets R. The summary image 50 shows the placement of the second images 42 (FIG. 2). The user can accordingly easily understand the placement of each of the sheets R with the second image 41 formed thereon when combining the sheets R, according to the first embodiment. As a result, operation efficiency when combining the sheets R is further improved.

Specifically, the summary image 50 includes a reduced-size image 40S of the first image 40. The user can accordingly understand the placement of each sheet R with a second image 41 formed thereon intuitively, and operation efficiency when combining the sheets R is further improved according to the first embodiment.

The reduced-size image 40S is divided into a plurality of areas 44 corresponding to the second images 41. The reduced-size image 40S also includes a plurality of first marks 51 corresponding respectively to the second images 41. The first marks 51 indicate identification information (identification numbers, for example) of the second images 41, respectively.

As illustrated in FIG. 10, the image forming section 30 also forms a plurality of second marks 52 on the sheets R, respectively. The second marks 52 correspond to the first marks 51 (FIG. 9), respectively. The second marks 52 accordingly indicate identification information (identification numbers, for example) of the second images 41, respectively. Each of the second marks 52 is formed on the rear surface of the corresponding sheet R. Note that the second images 41 are formed on the image forming surfaces of the sheets R.

According to the first embodiment, the user can understand the placement of the sheets R intuitively by referring to the first marks 51 and the second marks 52 when combining the sheets R. As a result, operation efficiency when combining the sheets R is further improved.

Note that the first marks 51 may indicate the sequence to which the sheets R are combined. The second marks 52 may also indicate the sequence to which the sheets R are combined. The placement of the sheets R and the sequence to which the sheets R are combined are easily understood because the first marks 51 and the second marks 52 indicate the sequence to which the sheets R are combined. As a result, operation efficiency when combining the sheets R is further improved.

Figure 11:
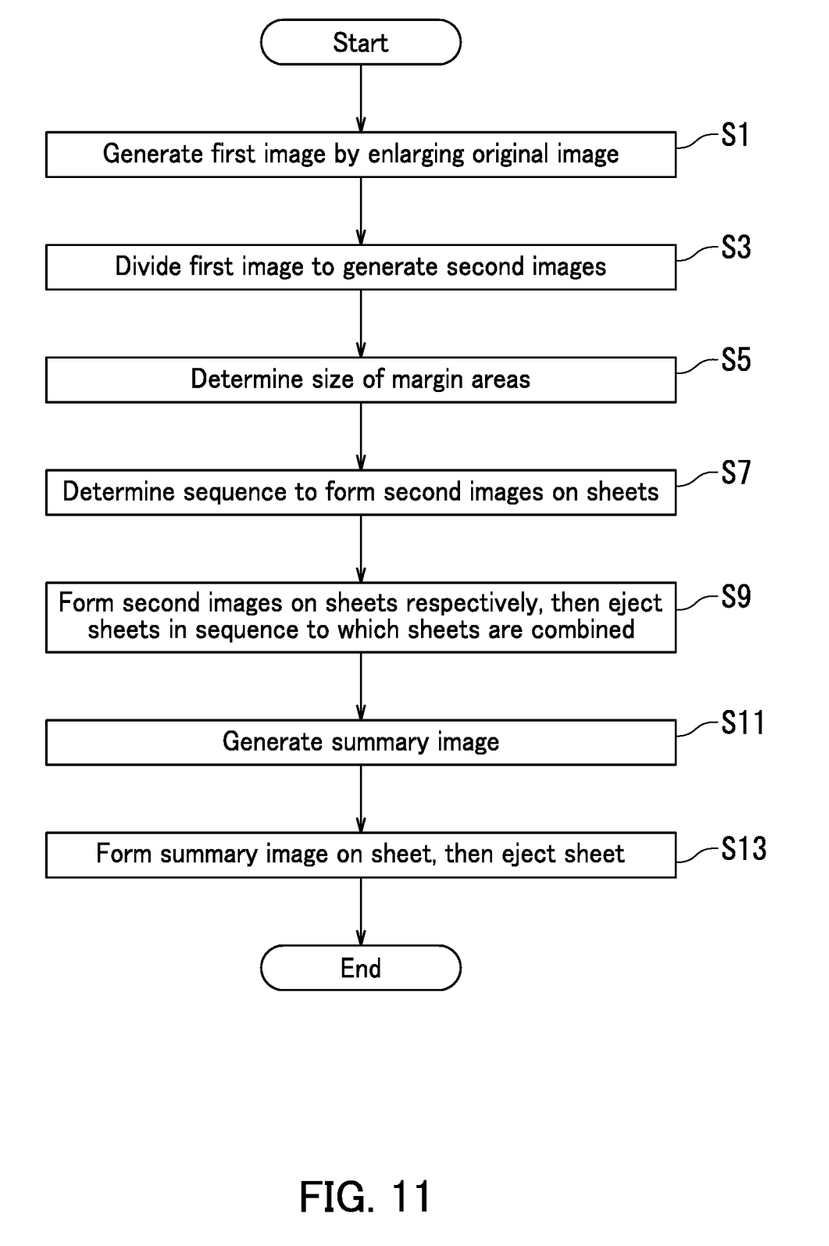
FIG. 11 is a flowchart illustrating the processing of the image forming apparatus according to the first embodiment.

Next, the processing of the image forming apparatus 1 will be described with reference to FIGS. 1 and 11. FIG. 11 is a flow chart illustrating the processing of the image forming apparatus 1. As illustrated in FIGS. 1 and 11, the generation section 10A generates the first image 40 by enlarging the original image 80 in Step S1.

In Step S3, the generation section 10A divides the first image 40 to generate a plurality of second images 41.

In Step S5, the size determining section 10B determines the sizes of the margin areas (specifically the first margin areas 42 and the second margin areas 43) allocated to some of the sheets R. Specifically, the size determining section 10B determines the sizes of the margin areas based on the sizes of the designated area 60 and the first image 40.

In Step S7, the sequence determining section 10C determines a sequence to which the second images 41 are formed on the sheets R based on the sequence to which the sheets R are combined.

In Step S9, the image forming section 30 forms the second images 41 on the sheets R, respectively, according to the sequence determined by the sequence determining section 10C. The ejection section 140 then ejects the sheets R in the sequence to which the sheets R are combined. Specifically, the image forming section 30 forms the second images 41 on the sheets R, respectively, so that the second images 41 are placed in the designated area 60 on the combined sheet CM2 formed by the combination of the sheets R.

In Step S11, the generation section 10A generates the summary image 50 based on the first image 40.

In Step S13, the image forming section 30 forms the summary image 50 on a sheet R. The ejection section 140 then ejects the sheet R with the summary image 50 formed thereon.

Note that the sequence of Steps S1 to S7 and Step S11 is not particularly limited as long as Steps S9 and S13 can be executed.

Second Embodiment

Next, the image forming apparatus 1 according to a second embodiment of the present disclosure will be described with reference to FIG. 1 and FIGS. 9 through 12. The image forming apparatus 1 according to the second embodiment differs from the image forming apparatus 1 according to the first embodiment illustrated in FIG. 1 in that the summary image 50 in FIG. 9 is formed on a sheet R on which a second image 41 is formed in the second embodiment. Hereinafter, the main point of difference between the second and first embodiments will be described.

Figure 12:
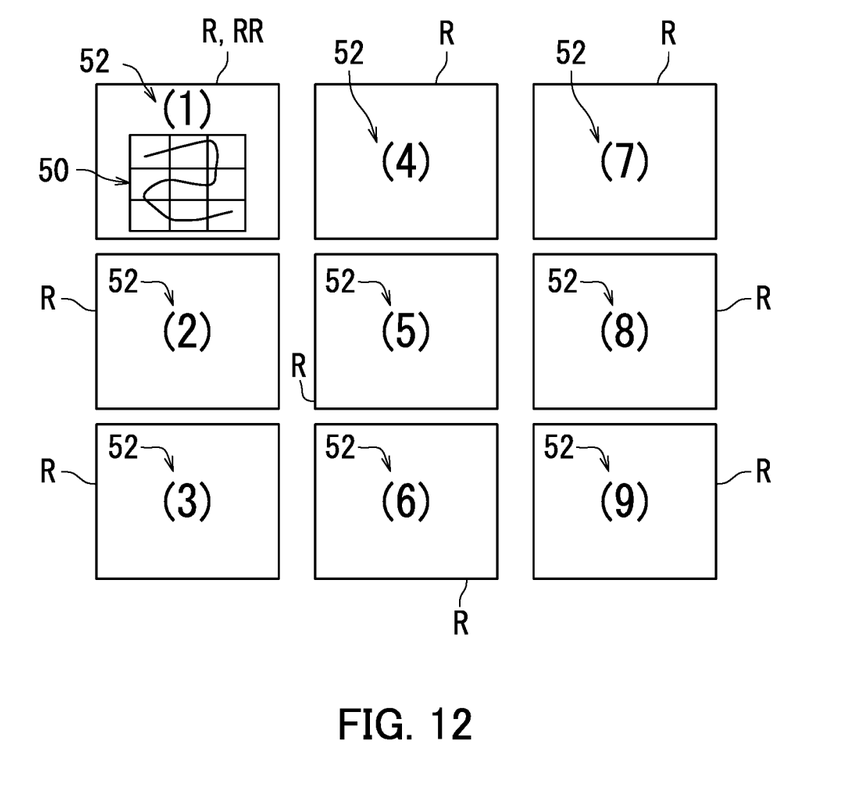
FIG. 12 is a diagram illustrating the rear surfaces of the plurality of sheets according to a second embodiment of the present disclosure.

FIG. 12 illustrates rear surfaces of the plurality of sheets R. In FIG. 12, elements that are the same as those in FIG. 10 are denoted with the same reference numbers and descriptions thereof are omitted. As illustrated in FIG. 12, the image forming section 30 forms the summary image 50 on a sheet R. The sheet R on which the summary image 50 is formed is the last sheet R to be combined from the plurality of sheets R with second images 41 formed thereon. The summary image 50 is formed together with the second marks 52 on the rear surfaces of the sheets R. Note that the second images 41 are formed on the image forming surfaces of the sheets R.

According to the second embodiment, the summary image 50 is not formed on a sheet R exclusively for the use thereof. The summary image 50 is instead formed on the rear surface of a sheet R with a second image 41 formed thereon. Additionally, the summary image 50 is formed on the sheet R to be combined last. The user can accordingly advance the combination work of the sheets R while referring to the summary image 50 until the end, saving the sheet R with the summary image 50 formed thereon.

Note that the image forming section 30 forms the summary image 50 on the rear surface of the reference sheet RR when the sheets R are ejected with the image forming surfaces facing upward. This is because the reference sheet RR is the sheet R to be combined last. On the other hand, the image forming section 30 forms the summary image 50 on a rear surface of a designated sheet when the sheets R are ejected with the image forming surfaces facing downward. This is because the designated sheet is the sheet R to be combined last. The designated sheet is the sheet R to be placed at the corner section in the direction intersecting with the first direction D1 and the second direction D2 from the plurality of sheets R when the combined sheet (the combined sheet CM2 in FIG. 7, for example) is formed, relative to the reference sheet RR. The designated sheet is the sheet R9 in FIG. 8A or 8B, for example.

The image forming apparatus 1 according to the second embodiment also executes processing in the same manner as the processing illustrated in the flowchart of FIG. 11. However, Step S11 is executed before Step S9, and Step S13 is not executed. In Step S9, the image forming section 30 also forms the summary image 50 on the rear surface of the sheet R to be combined last from the plurality of sheets R.

Embodiments of the present disclosure are previously described with reference to the drawings (FIGS. 1 to 12). However, the present disclosure is not limited to the above-mentioned embodiments, and may be implemented in various modes without deviating from the gist thereof. It is also possible to form various disclosures by appropriately combining multiple constituent elements disclosed in the above-mentioned embodiments. For example, a number of constituent elements may be removed from the entirety of constituent elements illustrated in the embodiments. The drawings show the main respective constituent elements schematically for ease of understanding, and the number and the like of the constituent elements illustrated may differ in practice. Also, the constituent elements illustrated in the above-mentioned embodiments are only examples, not particularly limited, and may be variously altered without substantially deviating from the gist of the effects of the present disclosure.

What is claimed is:

1. An image forming apparatus, comprising:
a generation section configured to divide a first image to generate a plurality of second images;
an image forming section configured to form the second images on a plurality of sheets, respectively; and
a size determining section configured to determine a size of a margin area to be allocated to at least one of the sheets, wherein
the image forming section forms the second images on the sheets, respectively, so that the second images are placed in a designated area on a combined sheet that is to be formed by combining the sheets,
the size determining section determines the size of the margin area based on a size of the designated area and a size of the first image,
the generation section enlarges an original image to form the first image,
the first image has a rectangular form, first sides, and second sides perpendicular to the first sides,
the designated area has a rectangular form, third sides corresponding to the first sides, and fourth sides corresponding to the second sides,
the original image has a rectangular form, fifth sides corresponding to the first sides, and sixth sides corresponding to the second sides,
the generation section enlarges the original image by the smaller of two magnifications: a first magnification or a second magnification,
the first magnification is a ratio of a length of the third sides to a length of the fifth sides, and
the second magnification is a ratio of a length of the fourth sides to a length of the sixth sides.

2. The image forming apparatus according to claim 1, wherein
the margin area has a default value related to the size thereof, and
the size determining section calculates a correction value for correcting the size of the margin area from the default value based on a difference between the third sides and the first sides or a difference between the fourth sides and the second sides.

3. The image forming apparatus according to claim 2, wherein
the size determining section calculates the correction value based on a division number of the first image and the difference between the third sides and the first sides or the division number of the first image and the difference between the fourth sides and the second sides, the division number being the number by which the first image is divided.

4. An image forming apparatus, comprising:
a generation section configured to divide a first image to generate a plurality of second images;
an image forming section configured to form the second images on a plurality of sheets, respectively;
a size determining section configured to determine a size of a margin area to be allocated to at least one of the sheets;
a sequence determining section configured to determine a sequence to which the second images are formed on the sheets based on a sequence to which the sheets are combined; and
an ejection section configured to eject the sheets so that a main surface with the second image from two main surfaces of each of the sheets faces upward, wherein
the image forming section forms the second images on the sheets, respectively, so that the second images are placed in a designated area on a combined sheet that is to be formed by combining the sheets,
the size determining section determines the size of the margin area based on a size of the designated area and a size of the first image,
the image forming section forms the second images on the sheets according to the sequence determined by the sequence determining section,
the size determining section sets one sheet from the plurality of sheets to be a reference sheet, the reference sheet having no margin area, and
the ejection section ejects the reference sheet last from the plurality of sheets.

5. The image forming apparatus according to claim 4, wherein
the image forming section forms a third image on a rear surface of the reference sheet, the third image showing placement of the second images.

6. An image forming apparatus, comprising:
a generation section configured to divide a first image to generate a plurality of second images;
an image forming section configured to form the second images on a plurality of sheets, respectively; and
a size determining section configured to determine a size of a margin area to be allocated to at least one of the sheets, wherein
the image forming section forms the second images on the sheets, respectively, so that the second images are placed in a designated area on a combined sheet that is to be formed by combining the sheets,
the size determining section determines the size of the margin area based on a size of the designated area and a size of the first image,
the image forming section forms a third image on a sheet, the third image showing placement of the second images,
the third image includes a reduced-size image of the first image,
the reduced-size image is divided into a plurality of areas corresponding to the second images and includes a plurality of first marks corresponding respectively to the second images,
the image forming section forms a plurality of second marks on the sheets, respectively,
the second marks correspond to the first marks, respectively, and each of the second marks is formed on a main surface without the second image from two main surfaces of the corresponding sheet.

7. The image forming apparatus according to claim 6, wherein the first marks indicate a sequence to which the sheets are combined, and the second marks indicate the sequence to which the sheets are combined.

8. The image forming apparatus according to claim 6, wherein the sheet on which the third image is formed is the last sheet to be combined from the plurality of sheets that is to form the combined sheet, and the third image is formed on a main surface without the second image from two main surfaces of the last sheet.

\* \* \* \* \*